Patented Jan. 28, 1930

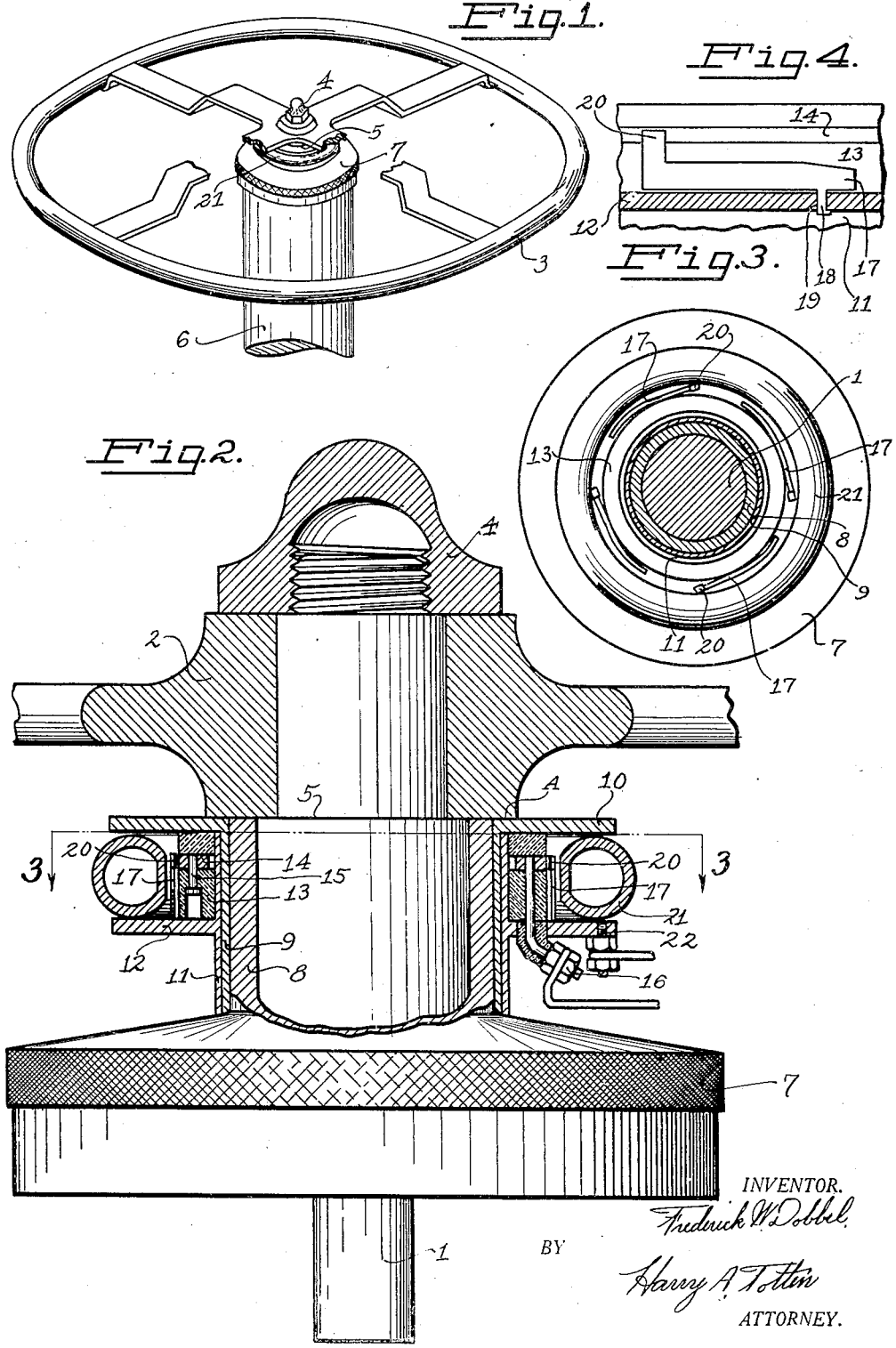

1,744,828

UNITED STATES PATENT OFFICE

FREDERICK W. DOBBEL, OF SONOMA, CALIFORNIA

ELECTRIC SWITCH

Application filed May 31, 1927. Serial No. 195,201.

This invention relates to an operating or controlling means for electric signalling devices particularly for employment on motor driven vehicles. The invention in its broadest aspect relates to what may be termed an electric switch designed primarily for steering post mounting beneath the steering wheel spider to enable the operator to have contact with the operating element of the switch without releasing the hands from the steering wheel.

The invention has for its principal object to provide an electric switch construction for mounting on the steering post of a motor driven vehicle and provided with a ring or annulus disposed circumferentially of the steering post and adapted for manual movement radially thereof by pressure being exerted at any point of its periphery, affording a means for making the circuit contact. Another object is to provide a construction wherein the movable contact members are of sufficient spring tension to restore the operating ring or annulus to normal position on pressure being released from any point on its periphery. A further object is to provide a structure wherein the operating ring or annulus is freely slidable between guide flanges, the bodies mounting the flanges having relative telescopic movement affording a mounting means for the contact elements of the switch structure. A further object is the provision of a switch structure which is exceedingly simple in its arrangement of parts, and which also may be constructed and installed at an exceedingly low cost.

With the above mentioned and other objects in view, the invention consists in the novel construction and combination of parts hereinafter described, illustrated in the accompanying drawings, and set forth in the claim hereto appended, it being understood that various changes in the form, proportion, size and minor details of construction within the scope of the claim may be resorted to without departing from the spirit or sacrificing any of the advantages of the invention.

To more fully comprehend the invention reference is directed to the accompanying drawings, wherein Fig. 1 is a view in broken perspective of the preferred embodiment of my invention mounted on the steering post of a steering wheel of the conventional Ford type.

Fig. 2 is a view in broken vertical section of a steering post and wheel hub with my invention mounted thereon.

Fig. 3 is a transverse sectional view on line 3—3 of Fig. 2, and

Fig. 4 is a view in elevation of one of the spring contact fingers.

In the drawings wherein like characters of reference designate corresponding parts, 1 indicates a conventional steering post, to the upper end of which is secured the hub 2 of a conventional steering wheel 3, the hub being held to the steering post by a nut 4 threaded on to the post and clamping the hub between its lower surface and the upper flanged surface 5 of the post. A shell 6 of conventional type protects the steering post, and to the upper end of the same is attached in any suitable manner a shell end closing cup 7, having an upstanding sleeve 8 surrounding that portion of the steering post below the flange 5. In the particular disclosure, the space between the upper surface of the cap 7 and the under face of the projecting rim A of the hub 2 affords a mounting for the preferred embodiment of my invention, but it is to be understood that the switch structure is adapted for construction in any size or proportion, and is adapted for mounting at any point on the steering post, steering wheel hub, or steering post projecting shell, just so long as the operator may conveniently reach the same.

The present embodiment of my invention comprises a tubular inner sleeve 9 formed at its upper edge with a laterally extending annular flange 10, the sleeve being adapted to snugly fit the periphery of the sleeve 8. Telescoping the sleeve 9 is an annular base ring 11 formed midway of its length with a base ring flange 12, lying in parallel spaced relation with the flange 10 when the upper edge of the base ring 11 is in contact with the inner surface of the flange 10. Positioned over the base ring 10 and resting on the inner surface of the flange 12 is an insulating base 13 consisting of superimposed rings between which is held a fixed annular contact ring 14, held in position by securing pins 15, and from said ring extends a conductor on binding post 16 passing through the flange 12 and insulated therefrom. Disposed in spaced relation circumferentially of the insulating base 13 are a plurality of spring contact fingers 17. Each finger 17 is provided at one end with a downwardly extended ear 18 projecting through an aperture 19 in the flange 12, the lower end of the ear being turned over affording a means for holding the respective contact fingers in operative position. It will thus be observed that the corresponding ends of the contact fingers are anchored in the base ring flange 12. The fingers 17 are curved on a greater radius than that of the insulating base 13 to afford a point of contact of the finger within its length with the periphery of the insulating base insuring the free end of the contact lying in spaced relation to the base, as indicated in the drawings. Each finger 17 has an upstanding extension 20 lying opposite the surface of the contact ring 14. Encompassing the insulating base 13, and lying between the flanges 10 and 12 is a contact operating ring 21 freely movable radially of the base 13, and its movement in any direction toward the base will cause a completion of the circuit between one or more of the spring contacts 17 and the fixed contact 14. On inward pressure being released from the ring 21, the tension of the compressed spring 17 is sufficient to restore the ring 21 to normal position. The conducting terminal 22 is associated with the flange 12, as illustrated.

It will be observed that the above described invention provides a switch designed for operation by a slight pressure applied to a ring, which pressure will force the ring radially in any direction and make one or more electric contacts.

I claim:—

An electric switch comprising a pair of tubular circumferentially flanged members for telescopic interfitting relation with the flanges lying in spaced relation, an annular insulating member lying between said flanges, a fixed contact member associated with said insulating member, a plurality of spring contact members between said flanges, insulated from said fixed contact member and normally spaced from said fixed contact member, conductor terminals common to said fixed contact member and said spring contacts, and an operating ring lying between said flanges and encompassing said spring contacts and movable radially of said tubular members to move one or more of said movable contacts into engagement with said fixed contact.

In testimony whereof I have signed my name to this specification.

FREDERICK W. DOBBEL.